United States Patent
Miles

(10) Patent No.: US 10,393,910 B2
(45) Date of Patent: Aug. 27, 2019

(54) APPARATUS FOR AIRBORNE GEOPHYSICAL PROSPECTING USING BOTH NATURAL AND CONTROLLED SOURCE FIELDS AND METHOD

(71) Applicant: CGG SERVICES SA, Massy (FR)

(72) Inventor: Philip Miles, Rockwood (CA)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/961,973

(22) Filed: Dec. 8, 2015

(65) Prior Publication Data

US 2016/0231449 A1    Aug. 11, 2016

Related U.S. Application Data

(60) Provisional application No. 62/114,648, filed on Feb. 11, 2015.

(51) Int. Cl.
  *G01V 3/165* (2006.01)
  *G01V 3/16* (2006.01)

(52) U.S. Cl.
  CPC .............. *G01V 3/165* (2013.01); *G01V 3/16* (2013.01)

(58) Field of Classification Search
  CPC .......... G01V 3/08; G01V 3/081; G01V 3/082; G01V 3/083; G01V 3/087; G01V 3/10; G01V 3/15; G01V 3/16; G01V 3/165; G01V 3/17
  See application file for complete search history.

(56) References Cited

U.S. PATENT DOCUMENTS

| | | | |
|---|---|---|---|
| 6,876,202 B2 | 4/2005 | Morrison et al. | |
| 7,157,914 B2 | 1/2007 | Morrison et al. | |
| 8,362,779 B2 | 1/2013 | Kuzmin et al. | |
| 8,400,157 B2 | 3/2013 | Kuzmin et al. | |
| 2003/0004647 A1* | 1/2003 | Sinclair | G01V 3/28 702/7 |
| 2005/0049820 A1* | 3/2005 | Kirsch | G01V 3/081 702/150 |
| 2009/0284258 A1* | 11/2009 | Morrison | B64B 1/02 324/330 |
| 2010/0244843 A1* | 9/2010 | Kuzmin | G01V 3/165 324/345 |
| 2011/0050230 A1* | 3/2011 | Kuzmin | G01V 3/165 324/330 |
| 2015/0285938 A1* | 10/2015 | Miles | G01V 3/165 324/336 |

(Continued)

*Primary Examiner* — David M Schindler

(74) *Attorney, Agent, or Firm* — Patent Portfolio Builders PLLC

(57) ABSTRACT

A composite electromagnetic (EM) system and method for measuring naturally occurring magnetic fields and controlled magnetic fields. The composite EM system includes a housing, an audio-magnetotelluric (AMT) system attached to the housing and measuring natural magnetic fields generated by earth, a frequency-domain EM (FDEM) system attached to the housing and measuring controlled magnetic fields generated by a controlled source, and a position and orientation (POS) system attached to the housing and configured to calculate an orientation and a position of the AMT system and housing relative to the earth. The housing is configured to be attached to an aircraft for being airborne while measuring the natural magnetic fields and the controlled magnetic fields.

18 Claims, 15 Drawing Sheets

(56) References Cited

U.S. PATENT DOCUMENTS

2015/0369944 A1\* 12/2015 Miles ..................... G01V 3/16
  324/331
2016/0161625 A1\* 6/2016 Partner et al. ......... G01V 3/165
  324/331

\* cited by examiner

APPARATUS FOR AIRBORNE GEOPHYSICAL PROSPECTING USING BOTH NATURAL AND CONTROLLED SOURCE FIELDS AND METHOD

CROSS-REFERENCE TO RELATED APPLICATIONS

This application claims priority and benefit from U.S. Provisional Patent Application No. 62/114,648, filed on Feb. 11, 2015, the entire disclosure of which is incorporated herein by reference.

BACKGROUND

Technical Field

Embodiments of the subject matter disclosed herein generally relate to methods and systems for measuring electromagnetic (EM) fields and, more particularly, to mechanisms and techniques for measuring both natural and controlled source electromagnetic fields.

Discussion of the Background

EM surveying is a method of geophysical exploration to determine the properties of a portion of the earth's subsurface, information that is especially helpful in the oil and gas industry and the mining industry. EM surveys may be based on a controlled source that sends EM energy waves into the earth, which induces eddy currents in the earth. The eddy currents generate a secondary EM field or ground response. By measuring the secondary field with an EM receiver, it is possible to estimate the depth and/or composition of the subsurface features. These features may be associated with subterranean hydrocarbon deposits.

A schematic airborne EM survey system 100 generally includes, as illustrated in FIG. 1, a transmitter 102 for generating a primary electromagnetic field 104 that is directed toward the earth. When primary EM field 104 enters the ground 108, it induces eddy currents 106 inside the earth. These eddy currents 106 generate a secondary electromagnetic field or ground response 110. An EM receiver 112 then measures the response 110 of the ground. Transmitter 102 and receiver 112 may be connected to an aircraft 114 so that a large area of the ground is swept. Receiver 112 may be located concentric and/or coplanar with transmitter 102. For a frequency-domain EM (FDEM) sensor, a bucking coil 113 may be added, that is concentric and/or coplanar with the receiver 112.

FDEM systems have been used successfully in the past to map near-surface conductivity structures in the range of 0 to 150 m below the surface. These systems work for frequencies ranging from 400 Hz to 150 kHz. However, a general limitation of these systems is the reduced earth penetration (i.e., up to 150 m). In the seismic field, for example, there are many situations when the oil reserves are below 150 m. Thus, there is a need to use another source and/or system for generating EM fields having lower frequencies, for example, in the range of 10 to 500 Hz, so that a depth of exploration is extended to potentially several kilometers. Note that the lower the frequency, the larger the penetration depth.

Such a source already exists and is associated with natural EM fields that exist in the Earth. Natural magnetic fields are used herein as meaning any magnetic field that is generated by the Earth itself, without human intervention. This term is in a sense opposite to controlled magnetic field, which is a magnetic field generated by human intervention, e.g., with a coil in which a varying current is flowing. Natural EM fields have been used in the past to investigate the conductivity structure of the earth, in both ground and airborne systems. The energy source for natural EM fields in the 10 Hz to 20 kHz audio-magnetotelluric (AMT) range is mainly worldwide thunderstorm activity. The usable range of AMT signals for a moving platform is between about 10 Hz and 500 Hz, which typically provides a depth of exploration from 100 m to potentially several kilometers. The remaining spectrum of the natural EM fields is not usable for the following reasons. There is a natural dead zone in the AMT spectrum, between 1 kHz and 5 kHz and for the 5 to 20 kHz range, although detectable, the AMT signals suffer from extreme variability and generally require stationary receivers.

Existing geophysical exploring systems use an aircraft to tow the FDEM systems and ground based systems for measuring the AMT fields. However, such a system is cumbersome and expensive, and thus, there is a need to have a new system that is capable of measuring both controlled EM fields and AMT fields at the same time eliminating inaccuracies associated with combining independent data.

SUMMARY

One or more of the embodiments discussed herein illustrate a composite EM system that is capable of simultaneously recording controlled EM fields and AMT fields while being carried by an aircraft above a desired part of the earth.

According to one embodiment, the composite EM system includes a housing; an audio-magnetotelluric (AMT) system attached to the housing and measuring natural magnetic fields generated by earth; a frequency-domain EM (FDEM) system attached to the housing and measuring controlled magnetic fields generated by a controlled source; and a position and orientation (POS) system attached to the housing and configured to calculate an orientation and a position of the AMT system and housing relative to the earth. The housing is configured to be attached to an aircraft for being airborne while measuring the natural magnetic fields and the controlled magnetic fields.

According to another embodiment, there is a method for recording naturally generated magnetic fields and controlled magnetic fields, with an airborne composite EM system. The method includes flying the composite EM system with an aircraft; recording the natural magnetic fields with an audio-magnetotelluric (AMT) system; recording the controlled magnetic fields with a frequency-domain EM (FDEM) system; and calculating a position and orientation of the AMT system relative to earth with a position and orientation (POS) system. The AMT system, FDEM system and the POS system are located on a common platform.

According to still another embodiment, there is a non-transitory computer readable medium storing executable codes which, when executed on a computer, makes the computer perform a method as noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a FDEM system having a bucking coil. However, the embodiments to be discussed next are not limited to such systems, but they may work with any EM sensor that has minimal interference with the AMT system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a composite EM system includes at least one FDEM system and at least one AMT system attached to the same platform. The platform is suitable for airborne surveys. The systems have extremely low frequency receiver coil suspension systems for attenuating motion-induced noise introduced by the act of towing the composite EM system above ground. Details about the composite EM system are now discussed with regard to the figures.

Figure 1:
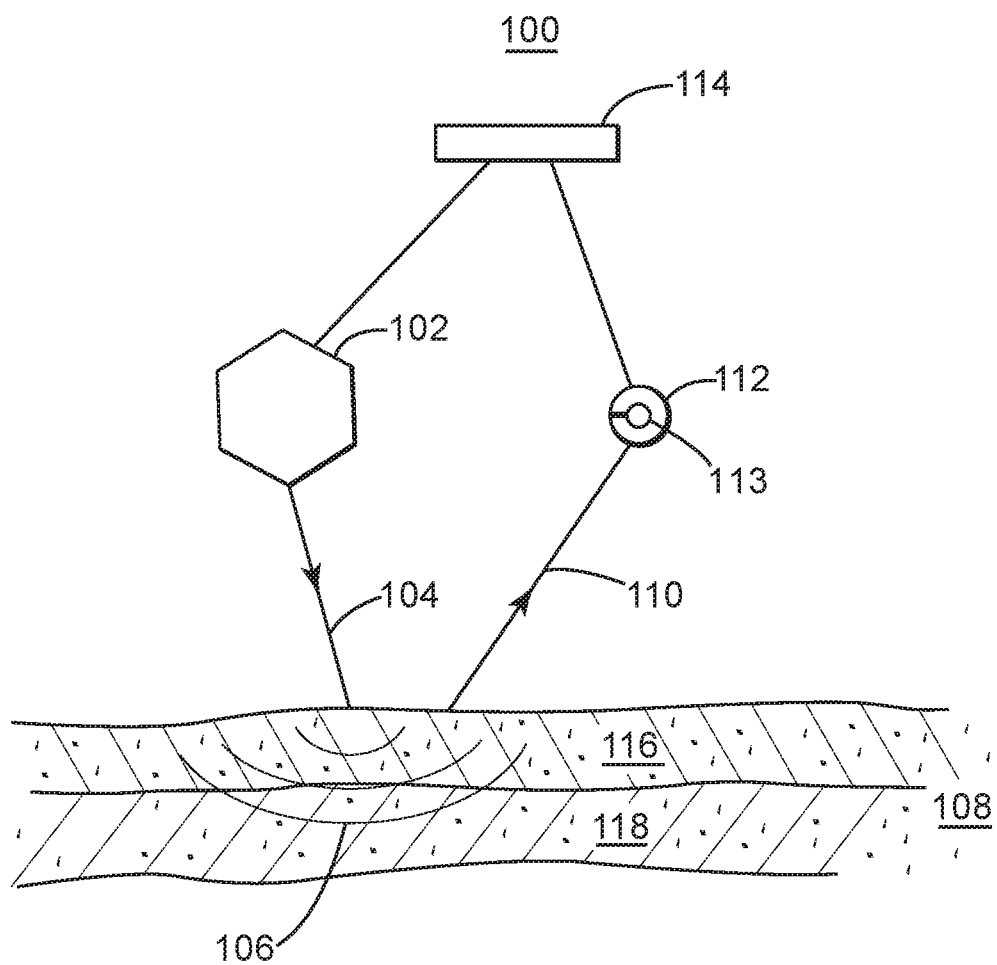
FIG. 1 is a schematic diagram of an EM acquisition system.
Figure 2:
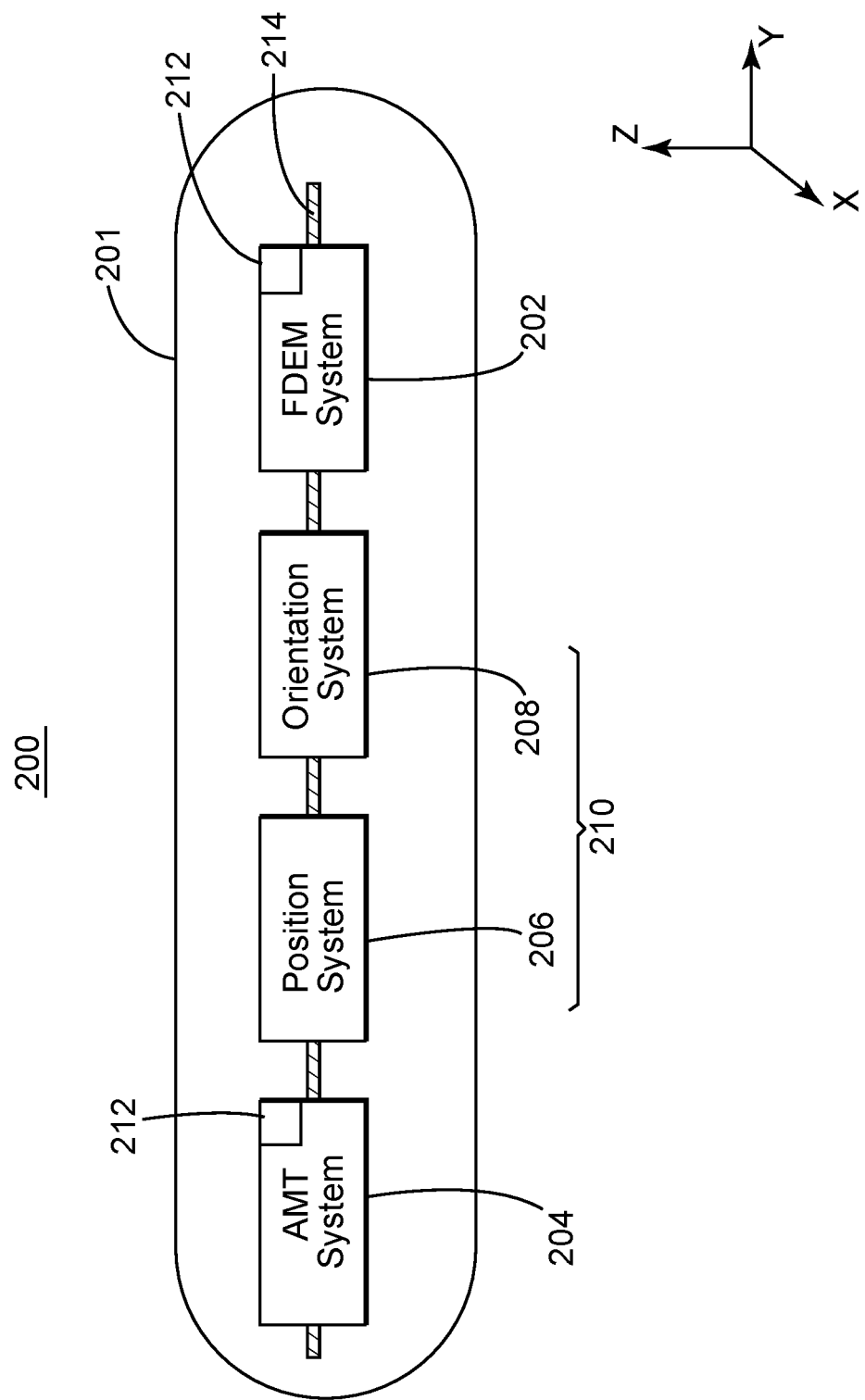
FIG. 2 is a schematic diagram of an EM system that measures natural magnetic fields and controlled magnetic fields.

FIG. 2 shows one embodiment of a composite EM system 200 that is designed for airborne geophysical exploration. Composite EM system 200 includes the FDEM system 202, the AMT system 204, a position system 206 and an orientation system 208. In one embodiment, the position and orientation systems are considered to be a single system 210, which is called from now on, position and orientation system (POS). All these components may be placed on a platform 214, inside a housing 201, for protecting them from ambient impurities and/or exposure to various agents (e.g., water) to prevent damage. In one embodiment, housing 201 has an aero-dynamical shape that reduces friction with the ambient and oscillating movement while the composite EM system is airborne and moving along a survey path.

In one embodiment, at least the AMT system 204 includes an Extremely Low-Frequency (ELF) coil suspension system 212. An ELF band is considered to be between 3 Hz and 30 Hz. The ELF coil suspension system 212 is discussed later in more detail. In one embodiment, both the AMT system 204 and the FDEM system 202 include their own ELF coil suspension system 212.

Figure 3B:
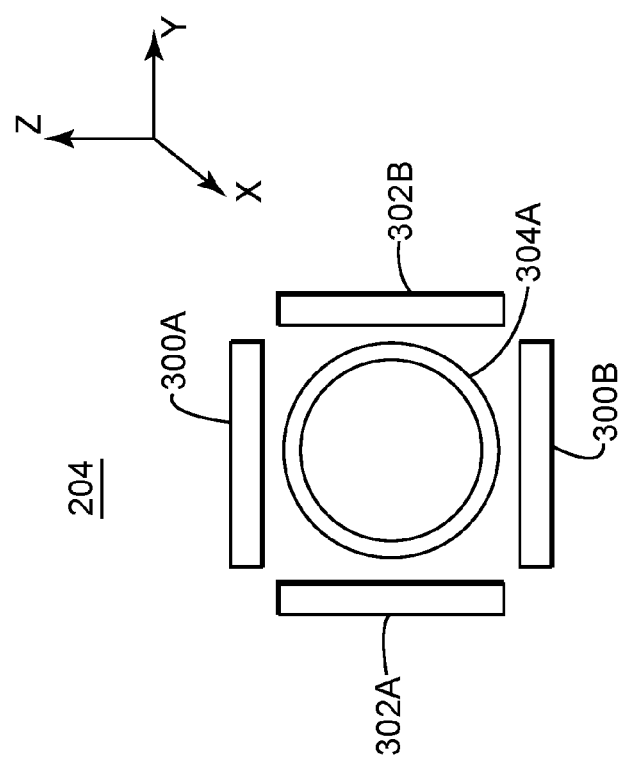
FIGS. 3A-C are schematic diagrams of an AMT system of the EM system.
Figure 3A:
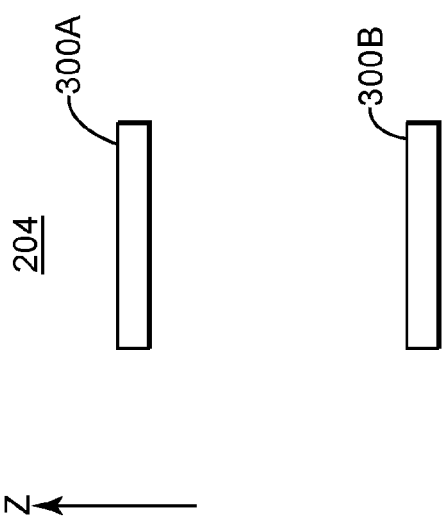
Figure 3C:
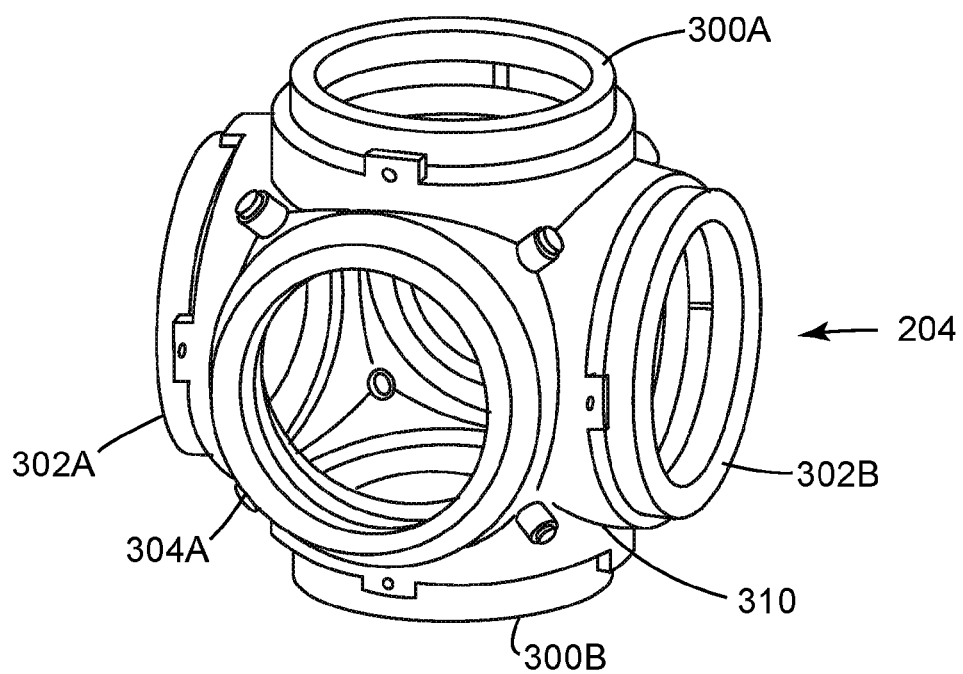

The AMT system 204 may include a number of coils (e.g., two or three or more) located with their axis along a given axis (e.g., Z axis) for measuring the AMT signals. FIG. 3A illustrates an embodiment in which AMT system 204 includes only a pair of coils 300A and 300B, oriented along Z axis while FIG. 3B illustrates an embodiment in which the AMT system 204 includes three pairs of coils 300, 302 and 304, each oriented on a different axis. A frame 310 supporting these coils is shown in FIG. 3C. Other configurations for frame 310 are possible. In one application, the AMT system 204 includes at least three coils oriented along direction Z.

While the 1 kHz bandwidth AMT coils are naturally insensitive to narrow band controlled source transmitters operating above 1 kHz, electromagnetic induction (EMI) is further reduced if each coil in each axis is sampled independently and combined in such a way as to cancel near-source fields, regardless of frequency. In this regard, note that the FDEM systems (which include transmitter coils) interfere with AMT systems if they emit the same frequencies. For this reason, the FDEM system is configured to use frequencies that do not interfere with the AMT system frequencies. This is one reason why FDEM systems are used instead of time-domain EM (TDEM) systems, i.e., because TDEM transmitters are broadband, they emit a wide range of frequencies that will obscure the AMT response. The AMT signal is fairly narrow band, similar to the FDEM systems. When choosing the frequencies for the FDEM system, e.g., outside of the bandwidth of the AMT receivers, there is very little damage to the small AMT signals. For this reason, large coils with high amplification may be used in one embodiment for the FDEM system. Any interfering signals seen by the AMT system will limit how much it is possible to amplify them, as the interfering signals seen by the AMT system will exceed the dynamic range of the analog-to-digital converters, thus destroying the signal.

One way to sample and combine the signals from the coils of the AMT system, to cancel near-source fields, regardless of frequency, is now discussed. The natural AMT fields are approximately plane-waves, with the same phase and signal strength over large areas. Near-source EMI fields are curled and fall off in amplitude at a relatively high rate, providing a gradient that can be sensed by two identical coils separated by relatively short distances (e.g., coils 300A and 300B in FIGS. 3A-C). According to this embodiment, the AMT signal is the average voltage sensed by the two coils 300A and 300B minus a scaled version of the difference between the two coils. The scale factor can be calculated empirically or determined experimentally using a calibration device or a simply direct comparison of the measured signals. This two (or more) coil arrangement can be used at an AMT base station to cancel 60 Hz or other cultural noise.

If three coils are used for each axis for the AMT system 204, the two outer coils can be connected in an opposing fashion to passively provide a gradient signal. The gradient signal could be gained appropriately and subtracted from the signal generated by the middle coil in the analog domain, thus providing a significant increase in the dynamic range (i.e., significantly more coil area and/or gain allowing either greater sensitivity or smaller physical coils).

Figure 4:
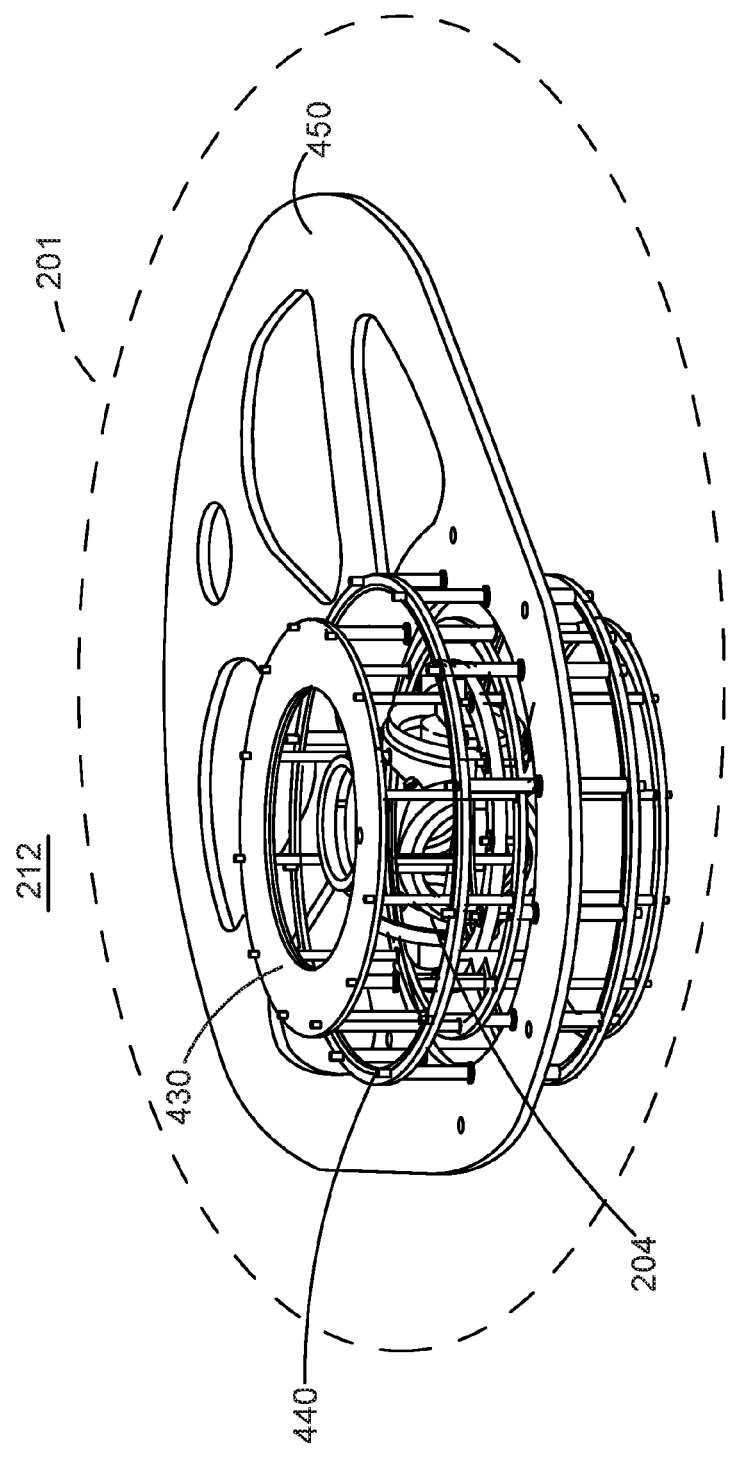
FIGS. 4-6 illustrate an extremely low-frequency coil suspension system.

As discussed above, the AMT system 204 may be attached to an ELF coil suspension system 212 as illustrated in FIG. 4. ELF coil suspension system 212 (called ELF system 212 from now on for brevity) may include, according to this embodiment, inner cage 430, outer cage 440, and a platform 450. Platform 450 may be part of platform 214 or can be attached to it. The AMT system 204 is suspended by elastic members from the inner cage 430, and the inner cage 430 is suspended with other elastic members from the outer cage 440.

Figure 5:
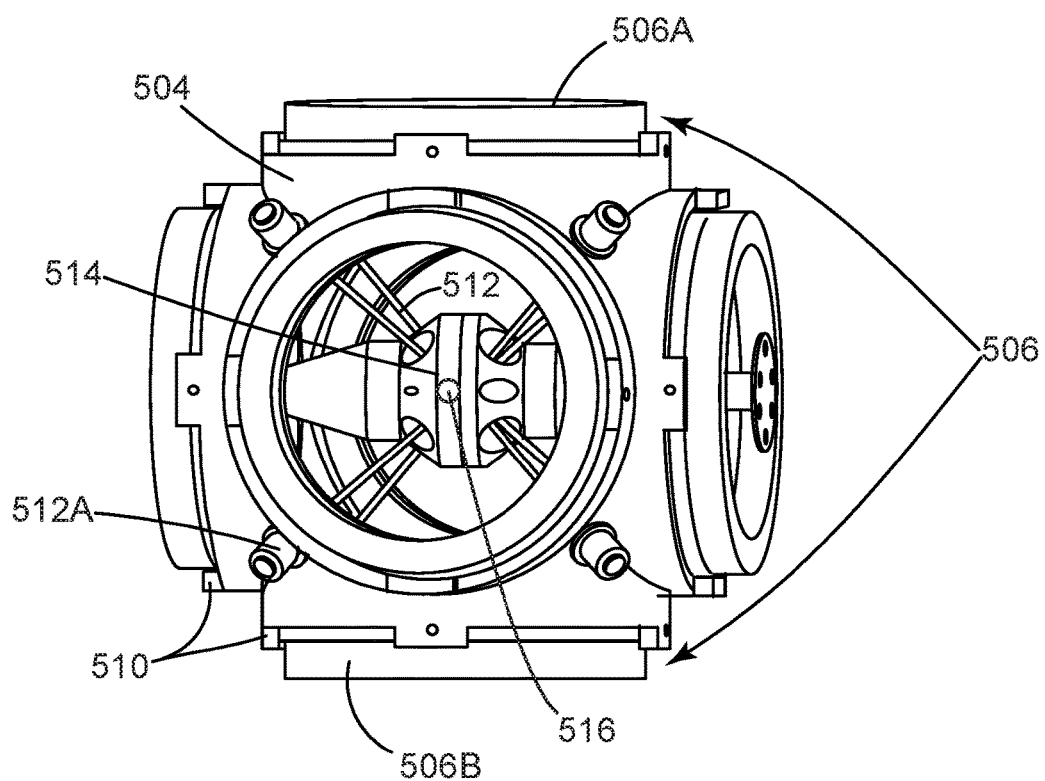

FIG. 5 illustrates one possible implementation of the AMT system 204. It includes a coil support 504 shaped to support AMT receiver coils 506A and 506B. One skilled in the art would understand that the specific shape of the coil support shown in FIG. 5 is exemplary and not intended to limit the invention. In one embodiment, coil support 504 is configured to house three pairs of coils, one for each axis of an orthogonal system of axes XYZ.

The embodiment illustrated in FIG. 5 shows AMT receiver coils 506 (those arranged to record the Z component of the magnetic field or a quantity related to the magnetic field) being physically split in half, with a first half 506A mounted on top of the coil support 504 and the other half 506B mounted at the bottom of the coil support. While it is possible to connect the two halves of the receiver passively, a summing amplifier 510 may be used to combine the measured voltages. Also note that receiver coils 506 may be all located at a same position on the coil support and, thus, no summing amplifier is needed.

Regardless of the arrangement of the AMT receiver coils, coil support 504 is attached by first elastic member (e.g., ropes) 512 to a spindle 514 such that AMT receiver coils 506 are free to rotate about the center of mass of coil support 504. In this embodiment, spindle 514 is located inside coil support 504. FIG. 5 shows heads 512A on the surface of coil support 504, and these heads connect to first elastic member 512. In one application, heads 512A are adjustable (e.g., they rotate relative to coil support 504) to strengthen or lessen the tension existent in each of the first elastic member 512. A first elastic member 512 may be made of any material that exhibits elasticity so that an internal tension can be adjusted as desired. In one application, first elastic member includes one or more elastic elements. An elastic element is configured to increase its length when a tension is applied along its length. In one application, the center of mass of the spindle is substantially coincident with center of mass 516 of the coil support 504.

One advantage of AMT system 204 is that AMT receiver coils 506A are free to rotate about center of mass 516, but only at a tuned frequency, which is about 0.01 to 0.5 Hz. Note that the tuned frequency depends on the characteristics of AMT system 204, e.g., shape, weight, etc. The first elastic member 512 makes up the first-stage isolation or suspension mechanism.

Figure 6:
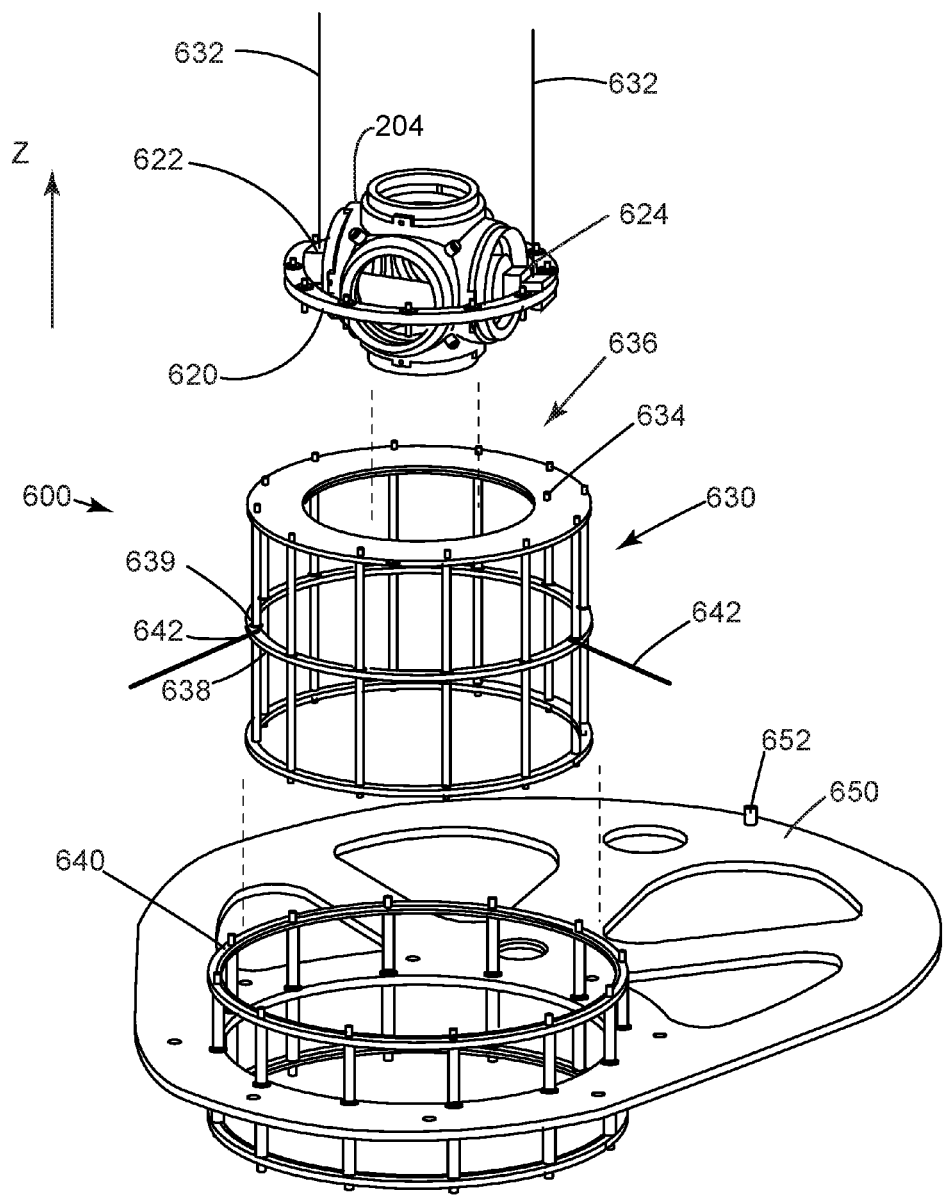

Spindle 514, and implicitly AMT system 204, is rigidly connected to an outer ring 620 as illustrated in FIG. 6. FIG. 6 shows the entire AMT system with the three-stages suspension mechanisms in an exploded view. For example, a bracket 622 may connect outer ring 620 to flanges of spindle 514. AMT system 204 and outer ring 620 are immersed or housed inside the inner cage 630. Inner cage 630 may have any configuration. FIG. 6 shows an embodiment in which the inner cage is cylindrical and the side walls are replaced by rods. Inner cage 630 may include an inner ring 638, around its internal circumference.

Outer ring 620 provides symmetrically placed connection points 624 (between four and sixty depending on the diameter of the outer ring) that allow near-vertical suspension of AMT system 204 from inner cage 630 using second elastic member 632.

Second elastic member 632 may be connected between connection points 624 of outer ring 620 and corresponding connection points 634 located (e.g., symmetrically) around and on top of ring 636 of inner cage 630. Thus, in this embodiment, second elastic member 632 is nearly vertical. The tension of second elastic member 632 may be adjusted to resonate at about 0.5 to 1 Hz. The outer ring may also provide connection points to allow attachment of damping elements below the coil assembly, first elastic member and spindle. In practice, the damping elements are rarely used. The second elastic member constitutes the second-stage suspension mechanism.

Inner cage 630 is connected to the outer cage 640 using a third elastic member 642. Third elastic member 642 supports inner cage 630 inside outer cage 640 so that inner cage 630 can rotate relative to the outer cage. Inner cage 630 may include an inner ring 638 having connection points 639 from which one end of third elastic member 642 is attached. Third elastic member 642 may include one or more elastic elements that connect between connection points 639 and outer cage 640. Third elastic elements may be vertical, horizontal or inclined with a certain angle relative to gravity. Outer cage 640 is rigidly connected to a supporting platform 650.

The third elastic member 642 constitutes the third-stage suspension mechanism for ELS system 212 discussed above. The AMT system 204 and other components of the composite EM system 200 may be enclosed in housing 201, as illustrated in FIG. 2, for protecting it from debris, water, solar exposure, etc. Housing 201 may be formed from removable upper and lower parts connected directly to platform 450/650.

Figure 7:
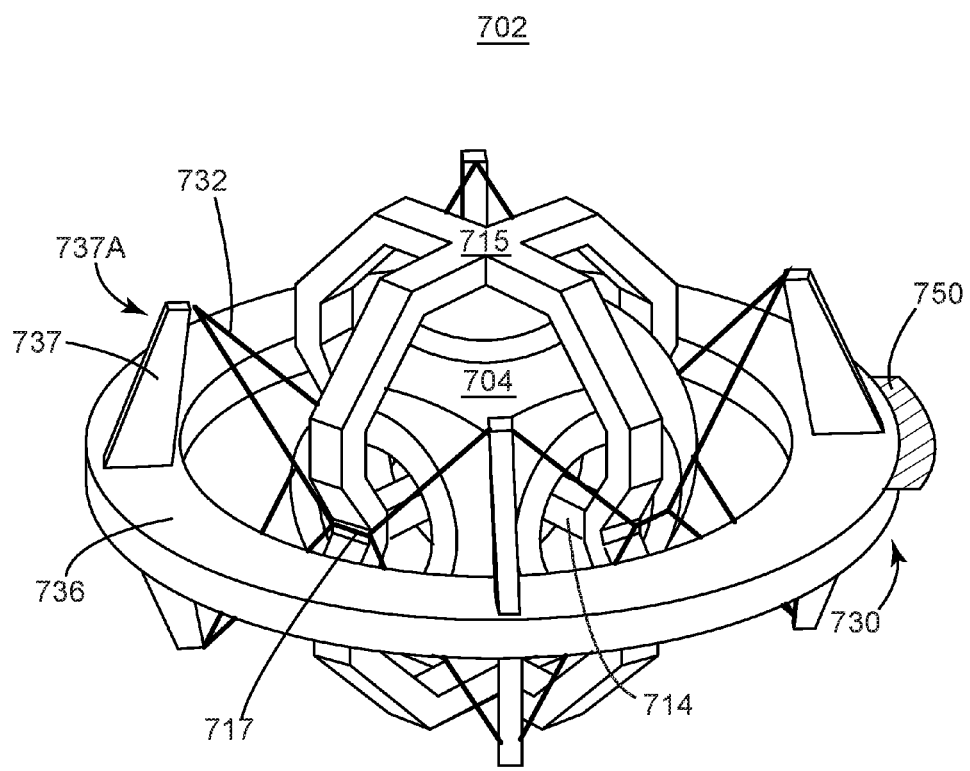
FIGS. 7-8 illustrate alternate embodiments of the extremely low-frequency coil suspension system.
Figure 8:
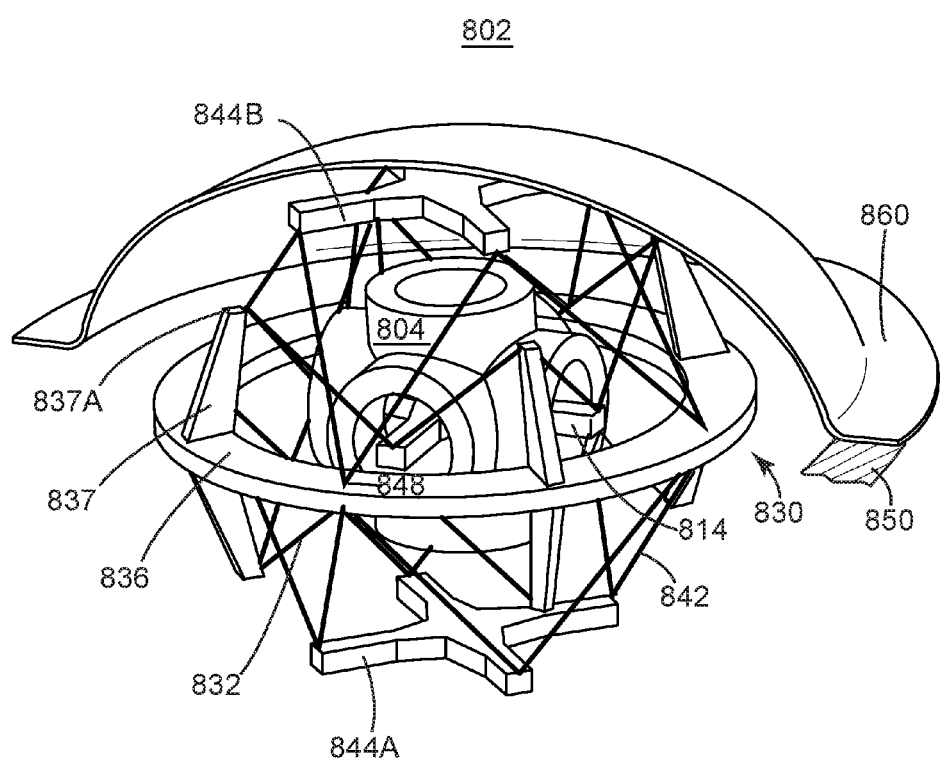

Alternatives of the ELF system 212 are illustrated in FIGS. 7-8. FIG. 7 illustrates a two-stage suspension mechanism and FIG. 8 illustrates a three-stage suspension mechanism. FIG. 7 shows an AMT system 702 that includes coil support 704 and inner cage 730 (this embodiment does not have an outer cage). AMT system 702 may have the same configuration/structure as AMT system 204 shown in FIG. 5. However, spindle 514 is now replaced with a more complex one 714 having a cross-like configuration and a frame 715 that encircles AMT system 204. Spindle 714 is rigidly attached to frame 715.

In the embodiment illustrated in FIG. 7, spindle 714 extends along two perpendicular axes, while frame 715 extends in two perpendicular planes and has ports 717 for receiving second elastic elements 732. First elastic members are not shown for simplicity, but they may have the same shape and configuration as first elastic members 512 in FIG. 5. Second elastic members 732 connect to (i) tips 737A on ring 736 of inner cage 730 and also to (ii) ports 717 on frame 715. Ring 736 may have arms 737 extending above and below the ring so that second elastic elements 732 connect to ports 717 from both above and below the ring as illustrated in FIG. 7. Ring 736 may be fixedly connected to platform 750, which is only partially illustrated in the figure. In one embodiment, ring 736 has four arms on the upper side and four arms on the lower side, symmetrically distributed along the ring.

FIG. 8 shows a similar embodiment, but instead of having a two-stage suspension mechanism, it has a three-stage suspension mechanism. Except for frame 715, all the elements from the previous embodiment are also present in this embodiment. For that reason, those elements are not discussed again. Third elastic elements 842 of the third-stage suspension mechanism connect inner ring 836 to two cross-like parts 844A and 844B that form the outer cage. One skilled in the art would note that outer cage parts 844A and 844B do not need to resemble an actual cage. The inner and outer cages terms are used in a generic sense to reflect some structure that may or not look like a cage. In this embodiment, outer cage parts 844A and 844B may have the same configuration/shape as spindle 814. Outer cage parts 844A and 844B may be rigidly attached to platform 850 by known means, e.g., bolts, welded.

One end of third elastic elements 842 may connect to tips of outer cage parts 844A and 844B, as shown in the figure, while the other end may connect at ports 848, between arms 837. Ports 848 are attached to ring 836. A dome 860 may be used to cover the entire coil assembly and suspension stages. Dome 860 may be connected directly to platform 850.

Figure 9:
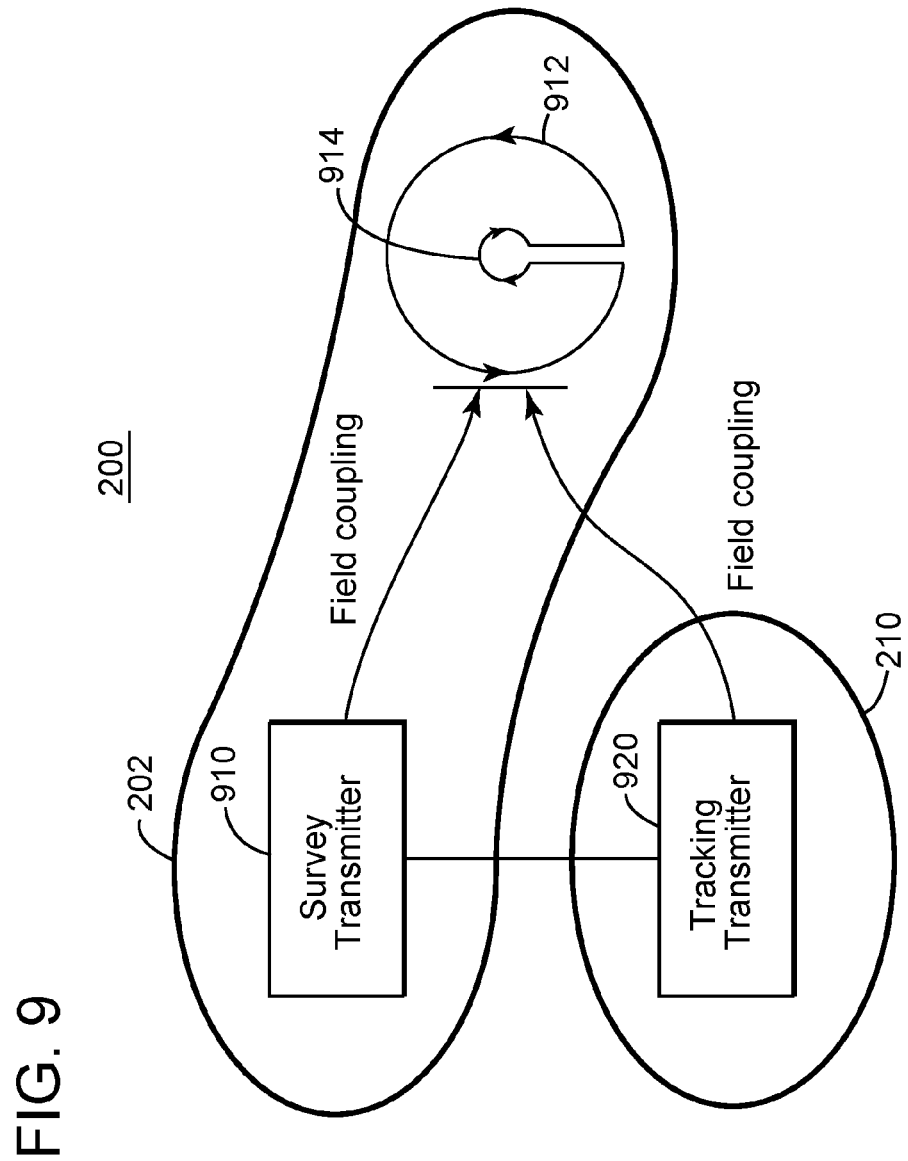
FIG. 9 illustrates an FDEM system.

The position and orientation system 210 (called POS system herein) is now discussed. FIG. 9 shows part of the composite EM system 200, i.e., FDEM system 202 and POS system 210. FDEM system 202 includes a transmitter 910, a receiver 912, and a bucking coil 914, which may be located in the same plane (i.e., coplanar) and may be concentric to each other. The number of turns in each coil may vary depending on the survey. The FDEM system 202 illustrated in FIG. 9 includes coils oriented along the Z axis. However, the FDEM system 202 may include corresponding coils for each direction X, Y and Z. In one embodiment, the FDEM system includes minimally two pairs of collocated coaxial and/or coplanar coils with conventional bucking and calibration circuits. Typical frequencies include 1800 Hz coax, 1800 Hz coplanar, 8 kHz coplanar and 8 kHz coax with optionally a fifth coil set at 56 kHz. These frequencies are exemplary and those skilled in the art would know to use different frequencies depending on the survey.

POS system 210 is shown having a tracking transmitter 924. Transmitter 910 generates a primary EM field and the receiver 912 measures the secondary EM fields, i.e., the ground EM response. The tracking transmitter 920 is configured to generate tracking signals. The tracking transmitter 920 may be located anywhere in the EM survey system. However, it is more advantageous to locate the tracking transmitter as close as possible to the receiver coil 912. The tracking signals are intended to be measured by the same receiver coil 912 that measures the survey EM signals, for deriving coordinates thereof, thereby enabling receiver movement compensation for the measured ground EM response. In one embodiment, a dedicated track receiver may be implemented.

Thus, according to this embodiment, the airborne composite EM system 200 includes two different and separated transmitters, a survey transmitter 910, which is part of the FDEM system 204 and a tracking transmitter 920, which is part of the POS system 210. Both transmitters are configured to emit their own specific range of frequencies.

In one application, the tracking transmitter 920 comprises at least one transmitter coil configurable to generate EM signals. Preferably, the tracking transmitter 920 includes at least two mutually orthogonal transmitter coils. A larger number of coils may be used for the tracking transmitter 920, for example, three mutually orthogonal transmitter coils each independently configurable to generate EM signals in respective directions.

In one application, receiver 912 includes one or more receiver coils each configurable to independently measure each of the tracking signals. In another application, receiver 912 includes at least two mutually orthogonal receiver coils. In yet another application, receiver 912 comprises three mutually orthogonal receiver coil assemblies each independently configurable to measure each of the tracking signals. All these applications discussed herein can be combined in any way as would be easily understood by one skilled in the art.

In one embodiment, at least one receiver coil is substantially aligned with at least one axis of the tracking reference frame. In one application, at least one tracking transmitter coil is substantially aligned with at least one axis of the tracking reference frame. For example, in some embodiments, an axis of at least one receiver coil or tracking transmitter coil is substantially parallel or coaxial with at least one axis of the tracking reference frame. The dimension or size of the tracking transmitter 920 is small relative to the distance between the tracking transmitter 920 and receiver 912.

The tracking transmitter 920 can be configured to generate signals using alternating current (AC), direct current (DC), or combination thereof. In an embodiment, in which a tracking transmitter 920 based on AC signals where three mutually orthogonal transmitter coils are used, a current is supplied to the transmitter coils in a sequence so that three mutually perpendicular electromagnetic fields are generated. The fields induce currents in the receiver 912 that has three mutually perpendicular coils. Based on the resulting nine induced currents, the receiver location and orientation relative to the tracking transmitter 920 can be estimated, as disclosed, for example, in U.S. Ser. No. 14/678,228. A frequency range of the tracking transmitter may overlap a frequency range of the survey transmitter. For example, the tracking transmitter may transmit in the 4-7 kHz range while the survey transmitter may transmit in the 30 Hz to 100 kHz range. Those skilled in the art would appreciate that other frequency ranges are possible.

Figure 10:
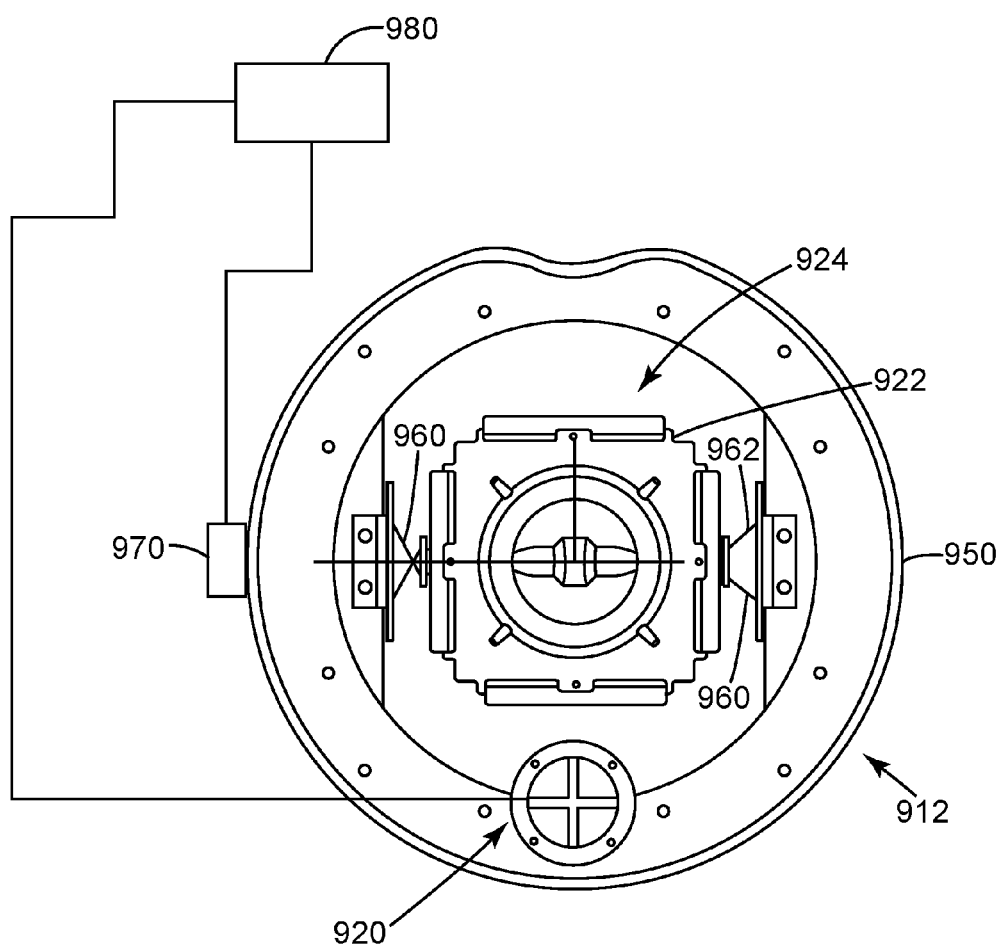
FIG. 10 illustrates FDEM and POS systems.

In one embodiment as illustrated in FIG. 10, receiver 912 is integrated with tracking transmitter 920 into a common frame 950. Receiver 912 includes a frame 922, which supports receiver coils 924 oriented perpendicular to each other. Tracking reference frame 950 is shown being elastically attached to frame 922 and receiver coils 924. Tracking transmitter 920 is rigidly attached to tracking reference frame 950 and includes a small three-axis magnetic-transmitter. A connecting mechanism 960 between tracking reference frame 950 and frame 922 may include plural cords 960. The cords may be elastic, e.g., bungee cords, so that the frame can freely translate and rotate in all directions. The number of cords depends at least on the weight of the receiver.

Receiver 912 may also include a GPS system 970 for determining a position and/or orientation of the tracking transmitter relative to ground. In this way, knowing (1) the position and/or orientation of the receiver relative to the tracking transmitter and (2) the position and/or orientation of the tracking transmitter relative to ground, a control mechanism 980, which is shown schematically communicating with the receiver, tracking transmitter and GPS system, can adjust/calculate the actual position and/or orientation of the receiver 912.

POS system 210 may include more GPS systems and, optionally, an altimeter, e.g., laser altimeter. POS system discussed herein may be replaced with other systems which are known in the art, for example, an optical system or conventional inertial measurement units (IMU).

As the final stage of the ELF suspension system discussed above allows the coils of the AMT system to rotate in the earth's magnetic field, this negatively impacts the AMT signal reduction. However, the POS system described here may relate the AMT system to the platform 214's orientation with better than 0.1 degree and 1 mm of accuracy, thus allowing for accurate detection of the AMT fields.

Figure 11:
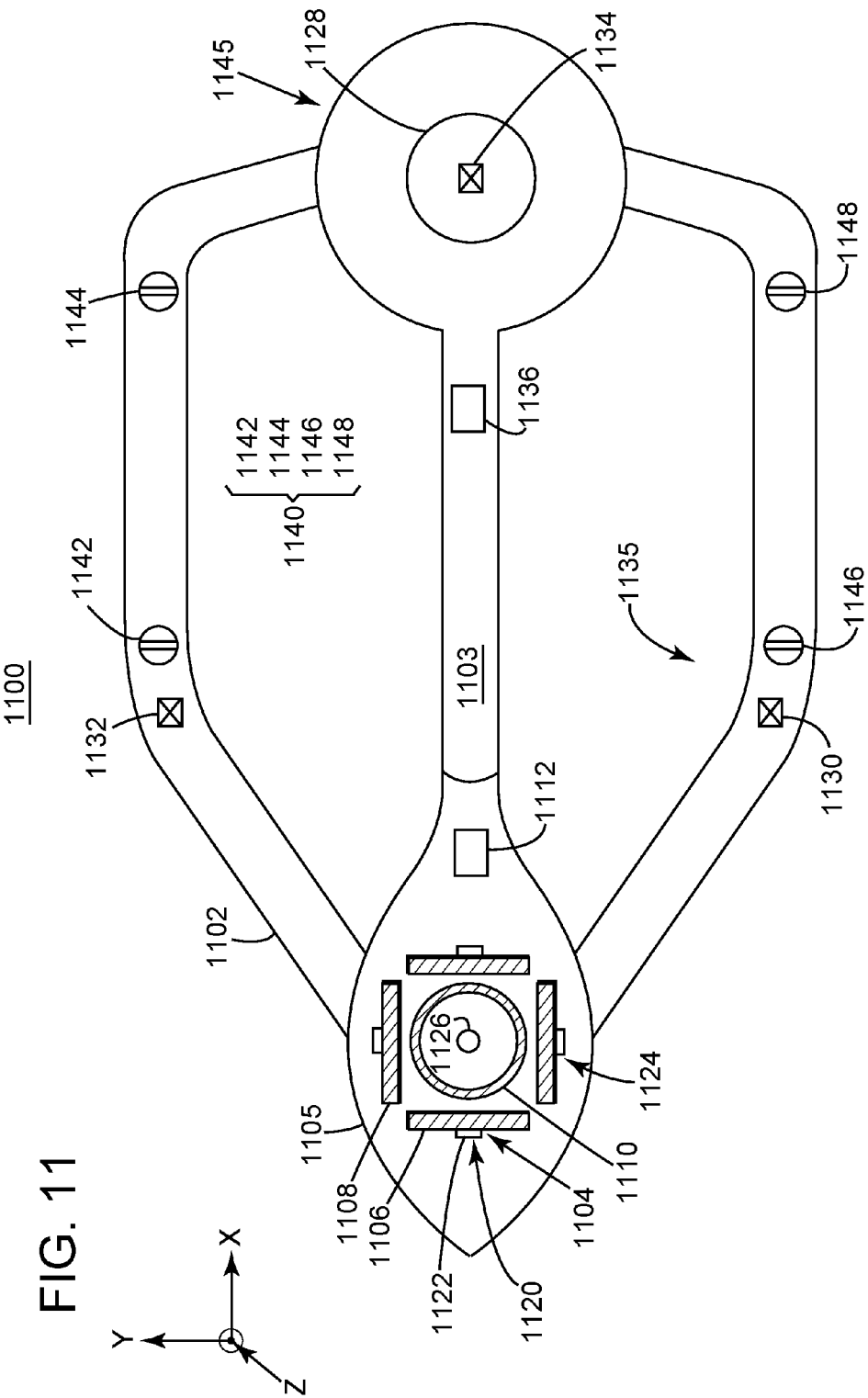
FIG. 11 illustrates an EM system that includes FDEM and AMT systems.

Having discussed each component of the composite EM system 200, FIG. 11 illustrates a specific implementation of such system. Those skilled in the art would understand that this is one of the many possible implementations of such system. FIG. 11 shows a composite EM system 1100 having a housing 1102 that includes one or more components. Housing 1102 may be made of tubular elements for defining an interior space 1103, which is protected from the ambient. The interior space 1103 houses one or more of the various components to be discussed now. The AMT system 1104 is housed at a frontal region 1105 of the housing 1102. The frontal region may have a larger diameter than the other portions of the housing. AMT system 1104 is shown in this embodiment having 3 sets of coils (or receivers) 1106, 1108, and 1110, each arranged along one of axes X, Y and Z. AMT system 1104 may be connected to a processing unit 1112 located either inside housing 1102, or on the aircraft, or distributed on both the housing and the aircraft. POS system 1120 may be located in the same frontal region 1105, and it may have three receivers 1122, 1124 and 1126, each oriented along one of axes X, Y and Z. In one embodiment, each POS receiver is located on a corresponding AMT receiver. These elements may also be electrically connected to processing unit 1112. POS system 1120 may also include a transmitter 1128 located in the tail region 1145. Note that while the embodiment of FIG. 9 discussed having the FDEM receivers functioning also as the POS system's receivers, the present embodiment illustrates the situation in which the FDEM system and the POS system have their own receivers.

One or more GPS systems 1130, 1132 and 1134 may be located inside or on housing 1102. Two GPS systems 1130 and 1132 may be located on a central region 1135 of the housing and the third GPS system 1134 may be located at a tail portion 1145 of the housing. The one or more GPS systems, if present, may be part of the POS system 1120. An altimeter (laser or equivalent device e.g., optical system) 1136 may be provided on or inside the housing for providing information related to the composite EM system's position.

The FDEM system 1140 may include one or more FDEM units 1142, 1144, 1146 and 1148. Each FDEM unit may include a transmitter, receiver and bucking coil as discussed with regard to the embodiment of FIG. 9. The FDEM units may be located in the central region 1135 of the housing. In one embodiment, a distance between adjacent FDEM units 1142 and 1144 along the X axis is about 6 m. For this specific distance, a length of the entire composite EM system 1100 is about 12 m along the X axis. Other components may be added to the housing as one of ordinary skill in the art would know, for example a temperature sensor, etc.

All these discussed electrical components may be connected to a processing unit 1112 for processing the recorded data. Because the AMT signals are extremely small, to reduce instrumentation noise, as many as eight parallel signal paths, including the analog-to-digital conversion stage (24 or 32 bit converters) may be combined dynamically using the processing unit 1112. The processing unit may be either a digital signal processor or field programmable gate array. Signal-to-noise improves as a function of the square root of the number of parallel signal paths and for equivalent parallel paths. The parallel signal paths may contain different amplifier or analog to digital converter technologies providing a superior signal-to-noise improvement. Parallel signal paths can be applied to both the airborne composite EM system and the AMT base station. The processing unit, which is electrically connected to the AMT system, the FDEM system and the POS system, is configured to calculate an image of the surveyed surface based on the measured natural magnetic fields and the controlled magnetic fields.

An AMT base station measures the orientation of the magnetic field at ground level relative to a given reference system. The airborne AMT system discussed above measures the orientation of the magnetic fields at a given altitude. The difference between the two angles is the information used for determining the image of the subsurface. The angle measured by the AMT base station is the reference angle. For this reason, an AMT base station is traditionally positioned close to the survey area and it supports a variety of signal processing methods.

Figure 12:
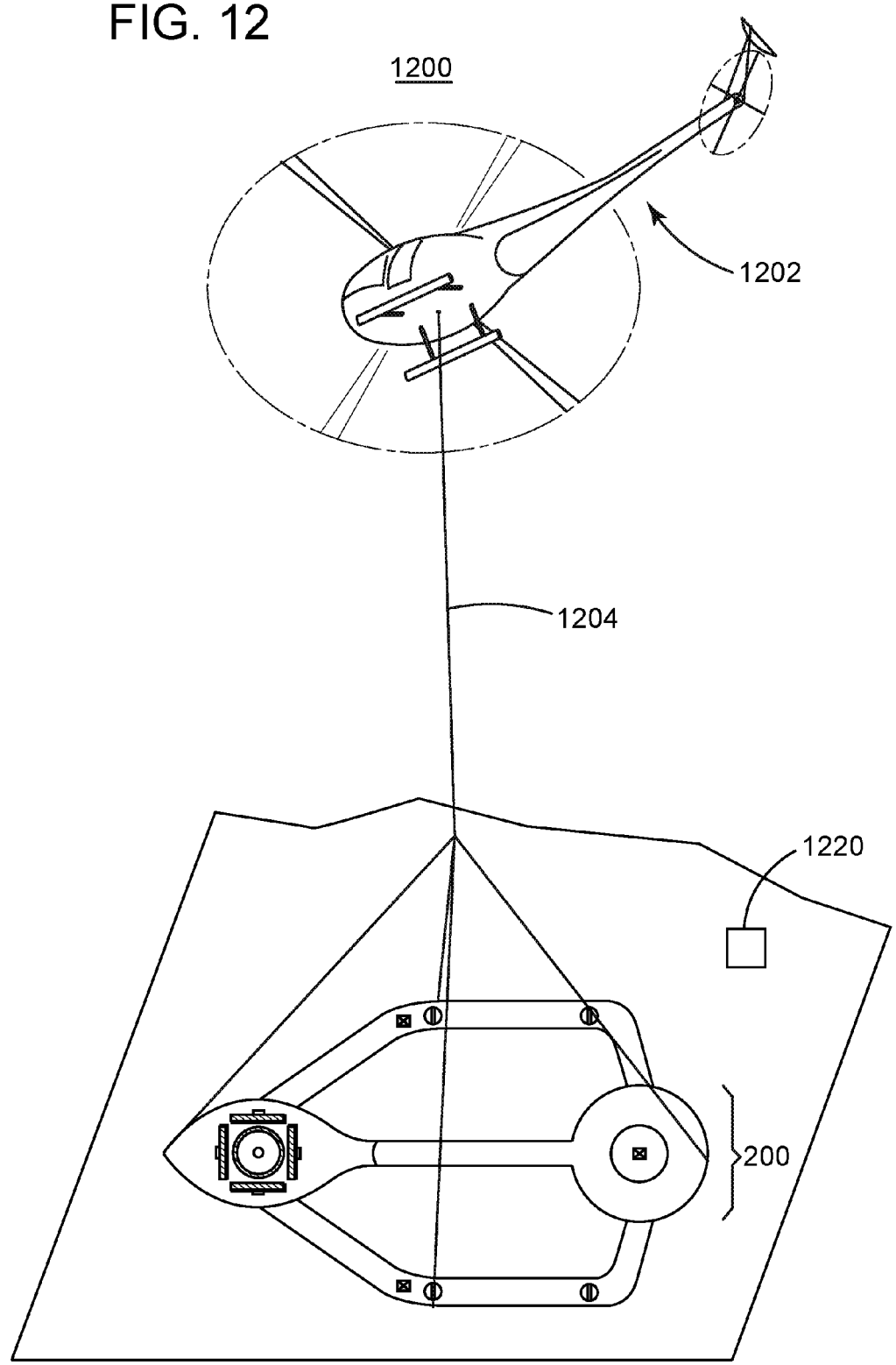
FIG. 12 illustrates an EM system being towed by an aircraft.

In this respect, FIG. 12 shows a survey system 1200 that uses an aircraft 1202 (e.g., a helicopter) that tows the composite EM system 200. Towing equipment 1204, which includes one or more links (e.g., ropes, cables, wires, etc.) connects aircraft 1202 to the composite EM system 200. Survey system 1200 may use an AMT base station 1220 for determining the reference orientation of the magnetic fields. However, AMT base station 1220 can be avoided if two or more composite EM systems 200 are flying in the same geographic area concurrently.

The composite EM system described herein provides an improvement in both vertical and spatial resolution of conductivity estimates over existing AMT only sensors, providing the widest frequency range of any existing airborne EM system, e.g., 30 Hz to 150 kHz.

Figure 13:
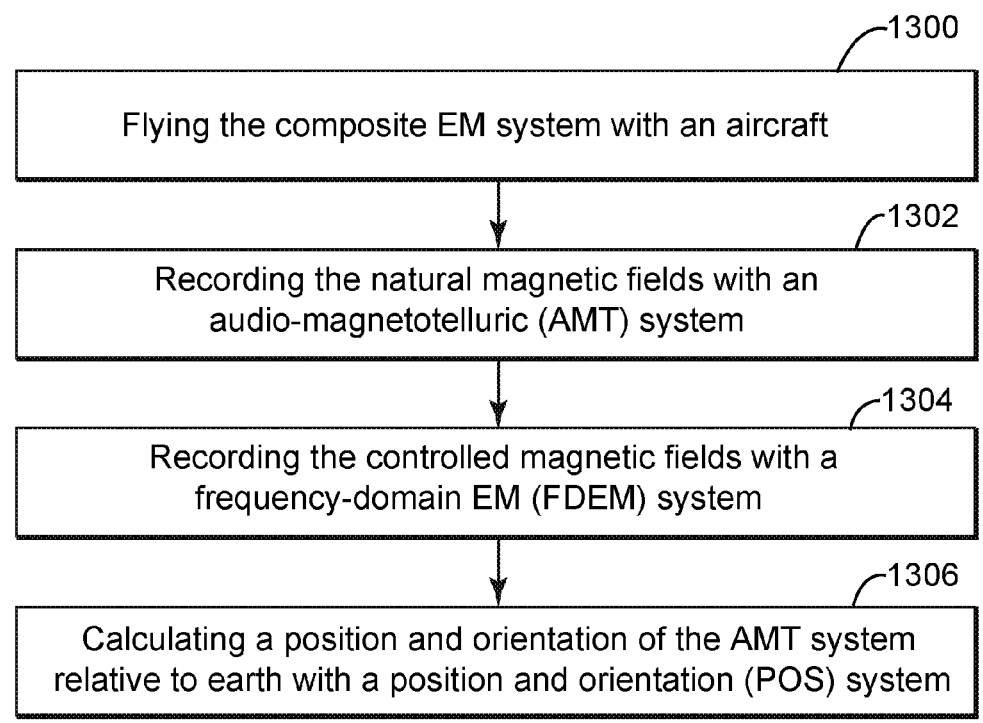
FIG. 13 is a flowchart of a method for performing an EM survey system with an AMT system and a FDEM system.

A method for recording naturally generated magnetic fields and controlled magnetic fields with an airborne composite EM system is now discussed with regard to FIG. 13. The method includes a step 1300 of flying the composite EM system with an aircraft, a step 1302 of recording the natural magnetic fields with an AMT system, a step 1304 of recording the controlled magnetic fields with a FDEM system, and a step 1306 of calculating a position and orientation of the AMT system relative to earth with a POS system. The AMT system, FDEM system and the POS system are located on a common platform.

There are many possible implementations of the composite EM system discussed above. The composite EM system may include, in addition to the components discussed above, many peripheral sensors to determine the position or orientation or state of the electromagnetic measurement, such as a Global Positioning System (GPS), radar or laser altimeter, gyroscopes or inclinometers measuring transmitter or sensor positions, thermometers, or other sensors measuring other geophysical data (such as radar or laser for topography, gravity or gradiometers sensors, spectrometer sensors, magnetometers to measure the ambient earth magnetic field, etc.). Consequently, there are also many different methods to record, process, combine and control all of these signals and sensors.

Figure 14:
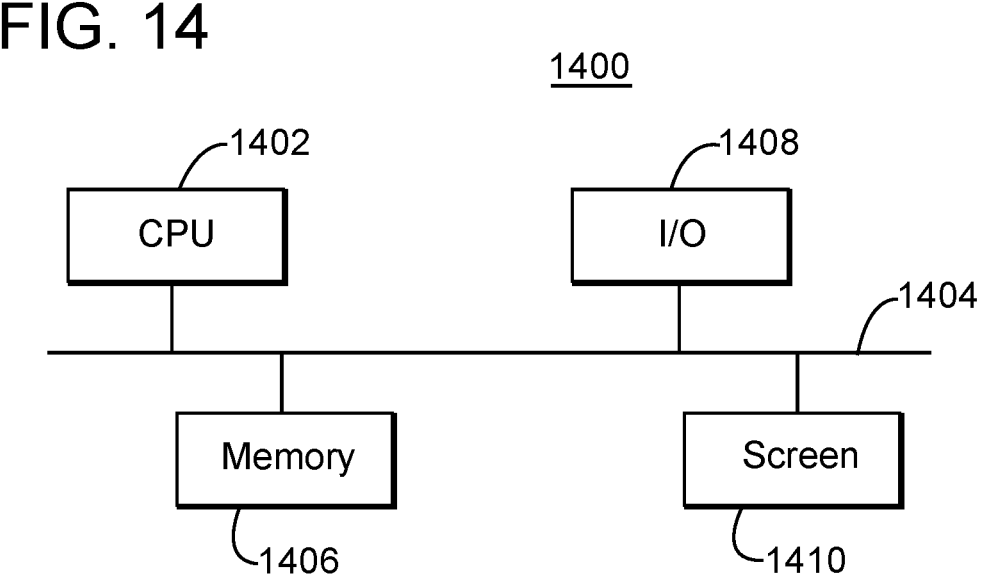
FIG. 14 is a schematic diagram of a processing unit that coordinates the AMT and FDEM systems.

As also will be appreciated by one skilled in the art, the exemplary embodiments may be embodied in processing unit 1400 as illustrated in FIG. 14. Processing unit 1400 includes a processor 1402 that is connected through a bus 1404 to a storage device 1406. Processing unit 1400 may also include an input/output interface 1408 through which data can be exchanged with the processor and/or storage device. For example, a keyboard, mouse or other device may be connected to the input/output interface 1408 to send commands to the processor and/or to collect data stored in storage device or to provide data necessary to the processor. In one application, the processor calculates the position and orientation of composite EM system. Also, the processor may be used to process, for example, the signals collected during the survey. Results of this or another algorithm may be visualized on a screen 1410. The method discussed above may be implemented in a wireless communication device or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. Furthermore, it is anticipated that the shape of various components may be different when reduced to practice, for example. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a method and composite EM system capable of recording EM signals generated naturally by the earth and by a source controlled by a human. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A composite electromagnetic (EM) system for measuring EM signals, the composite EM system comprising:
    a housing having a front region, a middle region and a tail region, the middle region including plural tubular elements, the front region having a larger diameter than any of the plural tubular elements of the middle region and the tail region;
    an audio-magnetotelluric (AMT) system attached to the front region of the housing and measuring natural magnetic fields generated by earth;
    a frequency-domain EM (FDEM) system attached to the middle region of the housing and measuring controlled magnetic fields generated by a controlled source; and
    a position and orientation (POS) system attached to the housing and configured to calculate an orientation and a position of the AMT system and housing relative to the earth, the POS system including (i) a coil transmitter located at the tail region of the housing and configured to generate EM signals, (ii) coil receivers located at the front region of the housing and configured to measure the EM signals, and (iii) a global positioning system (GPS) or an altimeter located at the middle region of the housing, wherein the housing is configured to be attached to an aircraft for being airborne while measuring the natural magnetic fields and the controlled magnetic fields.

2. The system of claim 1, wherein each of the AMT system and the FDEM system has an extremely low-frequency suspension system connecting corresponding measuring coils to the housing.

3. The system of claim 1, wherein the AMT system comprises:
    three pairs of coils arranged along three orthogonal axes.

4. The system of claim 1, wherein the AMT system comprises:
    three assemblies of coils, each assembly including three coils.

5. The system of claim 1, wherein the AMT system is located in the front region of the housing and the FDEM system is located in the middle region of the housing.

6. The system of claim 1, wherein the FDEM system includes four FDEM units, each unit including a transmitter, a receiver and a bucking coil.

7. The system of claim 1, wherein the coil transmitter of the POS system includes at least two mutually orthogonal coils.

8. The system of claim 1, wherein the coil receivers of the POS system are directly attached to the AMT system.

9. The system of claim 1, wherein the POS system includes the GPS and the altimeter.

10. The system of claim 1, further comprising:
    a processing unit that communicates with the AMT system, the FDEM system and the POS system and configured to calculate an image of a surveyed surface based on the natural magnetic fields and the controlled magnetic fields.

11. The system of claim 1, wherein the AMT system includes (1) receiver coils located on a coil support, and (2) a coil suspension system, the coil suspension system includes a spindle, an inner cage, and an outer cage, the coil support is suspended relative to the spindle with first elastic elements, the spindle is suspended relative to the inner cage with second elastic elements, and the inner cage is suspended relative to the outer cage with third elastic elements so that the inner cage rotates relative to the outer cage and the receiver coils rotate relative to the magnetic fields generated by earth.

12. A method for recording naturally generated magnetic fields and controlled magnetic fields, with an airborne composite EM system, the method comprising:

flying the composite EM system with an aircraft, wherein the EM system includes an audio-magnetotelluric (AMT) system, a frequency-domain EM (FDEM) system, and a position and orientation (POS) system;

measuring the natural magnetic fields with the AMT system;

measuring the controlled magnetic fields with the FDEM system; and calculating a position and orientation of the AMT system, relative to earth, with the POS system, wherein the AMT system, FDEM system and the POS system are located on a common platform, wherein the POS system further includes (i) a coil transmitter located at a tail region of the common platform and configured to generate EM signals, (ii) coil receivers located at a front region of the common platform and configured to measure the EM signals, and (iii) a global positioning system (GPS) or an altimeter located at a middle region of the common platform, the middle region including plural tubular elements, and wherein the front region has a larger diameter than any of the tubular elements of the middle region and the tail region.

13. The method of claim 12, wherein each of the AMT system and the FDEM system has an extremely low-frequency suspension system connecting corresponding measuring coils to the platform.

14. The method of claim 12, wherein the natural magnetic fields are recorded with three pairs of coils arranged along three orthogonal axes, the three pairs of coils being part of the AMT system.

15. The method of claim 12, wherein the controlled magnetic fields are recorded with four FDEM units, each unit including a transmitter, a receiver and a bucking coil, the four FDEM units being part of the FDEM system.

16. The method of claim 12, further comprising:
generating a corresponding controlled magnetic field with the coil transmitter that is part of the POS system.

17. The method of claim 12, further comprising:
calculating an image of a surveyed surface based on the natural magnetic fields and the controlled magnetic fields.

18. The method of claim 12, wherein the AMT system includes (1) receiver coils located on a coil support, and (2) a coil suspension system, the coil suspension system includes a spindle, an inner cage, and an outer cage, the coil support is suspended relative to the spindle with first elastic elements, the spindle is suspended relative to the inner cage with second elastic elements, and the inner cage is suspended relative to the outer cage with third elastic elements so that the inner cage rotates relative to the outer cage and the receiver coils rotate relative to the magnetic fields generated by earth.

* * * * *